(12) United States Patent
Burger et al.

(10) Patent No.: US 7,645,360 B2
(45) Date of Patent: Jan. 12, 2010

(54) DEFOAMER FORMULATIONS

(75) Inventors: Willibald Burger, Burghausen (DE); Christian Herzig, Waging (DE); Josef Wimmer, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/915,941

(22) PCT Filed: May 24, 2006

(86) PCT No.: PCT/EP2006/004948

§ 371 (c)(1),
(2), (4) Date: Nov. 29, 2007

(87) PCT Pub. No.: WO2006/128624

PCT Pub. Date: Dec. 7, 2006

(65) Prior Publication Data

US 2008/0200608 A1    Aug. 21, 2008

(30) Foreign Application Priority Data

Jun. 2, 2005    (DE) .................. 10 2005 025 450

(51) Int. Cl.
*D21H 21/00*    (2006.01)
(52) U.S. Cl. .................. 162/164.4; 516/117; 516/118; 516/128; 516/130; 516/131; 516/134; 516/124; 528/10; 528/25; 528/28; 528/29; 528/31; 528/33; 528/44

(58) Field of Classification Search ......... 516/117–118, 516/123–124, 128, 130–131, 134; 528/10, 528/25, 28–29, 31, 33, 44; 162/164.4
See application file for complete search history.

(56) References Cited

U.S. PATENT DOCUMENTS

| | | | |
|---|---|---|---|
| 3,246,048 A | | 4/1966 | Haluska |
| 3,398,172 A | * | 8/1968 | Noll et al. .................... 556/420 |
| 5,523,019 A | | 6/1996 | Kim |
| 5,625,024 A | | 4/1997 | Schlitte et al. |
| 6,605,183 B1 | * | 8/2003 | Rautschek et al. ............ 162/72 |

FOREIGN PATENT DOCUMENTS

| | | |
|---|---|---|
| DE | 56762 | 7/1967 |
| DE | 2925722 A1 | 2/1981 |
| DE | 10255649 A1 | 6/2004 |
| EP | 0341952 A2 | 11/1989 |
| EP | 0663225 A1 | 7/1995 |
| EP | 1076073 A1 | 2/2001 |
| WO | 98/00216 A1 | 1/1998 |

* cited by examiner

*Primary Examiner*—Randy Gulakowski
*Assistant Examiner*—Olatunde S Ojurongbe
(74) *Attorney, Agent, or Firm*—Brooks Kushman P.C.

(57) ABSTRACT

Defoamer compositions of high effectiveness containing at least one siloxane-based antifoam and polysiloxane copolymers obtained by coupling a polysiloxane bearing active-hydrogen-containing hydrophilic polymer moieties by means of a di- or polyisocyanate.

18 Claims, No Drawings

DEFOAMER FORMULATIONS

CROSS-REFERENCE TO RELATED APPLICATION

This application is the U.S. national phase of PCT Appln. No. PCT/EP2006/004948 filed May 24, 2006 which claims priority to German application DE 10 2005 025 450.0 filed Jun. 2, 2005.

BACKGROUND OF THE INVENTION

1. Field of the Invention

The invention relates to defoamer formulations comprising (A) siloxane-based antifoams and (B) polysiloxane copolymers, and also to their application to the defoaming of aqueous media, particularly aqueous media obtained in pulp production.

2. Description of the Related Art

In many liquid systems, especially aqueous systems, which include surface-active compounds purposefully or as unwanted constituents, it is possible for problems to occur as a result of foaming if these systems are contacted more or less intensively with gaseous substances, such as during the gassing of waste waters, during the intensive stirring of liquids, during distillation, washing or coloring operations or during dispensing processes, for example.

This foam can be controlled by mechanical means or through the addition of defoamers. Siloxane-based defoamers have proven particularly appropriate here.

Siloxane-based defoamers are prepared in accordance with DD-A 056 762, for example, by heating hydrophilic silica in polydimethylsiloxanes. This process is very costly and inconvenient, and in spite of this, the activity of the defoamers thus prepared is unsatisfactory. The dispersion of hydrophobized silica in a polydimethylsiloxane, in accordance for example with DE A 29 25 722, is a more rational process, but again the activity of the resulting defoamers is capable of improvement.

Likewise known is the use of modified polyorganosiloxanes in defoamer preparations. Thus, for example, the use of branched siloxane defoamers in combination with polyether-polysiloxane copolymers is recommended as defoamers, for example, for pulp production (EP-A 341 952). In combination with mineral oils as a carrier oil, as well, polyether-polysiloxane copolymers are said to have a positive effect (U.S. Pat. No. 5,523,019). According to WO 98/000216, siloxanes having dimethyl-3-hydroxypropylpolyoxyethyl-enepolyoxy-propylene groups are particularly suitable surfactants in defoamer formulations.

EP-A 633 225 and EP-A 1076073 claim crosslinked or branched polyorganosiloxanes, respectively, which carry at least one polyether moiety, as one of the two components of a defoamer formulation. The crosslinking in these cases is via alkylene groups, via poly-dimethylsiloxanes or via polyether groups. As a result of the Si—C linkage, the products are stable to hydrolysis.

In contrast to this, the process proposed in U.S. Pat. No. 5,625,024 also leads to Si—O—C-group linkages, which particularly in acidic or basic media are not stable to hydrolysis and therefore lose their activity in foaming aqueous medium.

DE 102 55 649 A describes defoamer formulations in which specially branched polyether-polysiloxane copolymers are added to known antifoam compositions. In the presence of water, however, defoamer formulations of this kind become less active.

The defoamer formulations prepared in accordance with the prior art either do not always have adequate activity or are not stable to hydrolysis.

SUMMARY OF THE INVENTION

It was an object of the invention, therefore, to avoid the disadvantages specified above and to provide siloxane-based defoamer formulations which exhibit an improved activity particularly in highly foaming, hot, alkaline media which are obtained, for example, in pulp production. These and other objects are achieved by defoamer compositions containing a siloxane-based antifoam and coupling a polysiloxane bearing active-hydrogen-containing hydrophilic polymer moieties by means of a di- or polyisocyanate.

The invention provides defoamer formulations comprising
A) siloxane-based antifoams and
B) polysiloxane copolymers preparable by reacting in a first step
organopolysiloxanes (1) which have per molecule at least one Si-bonded hydrogen atom, preferably at least two Si-bonded hydrogen atoms, with largely linear oligomeric or polymeric compounds (2) of the general formula

$$R^1\text{-}(A\text{-}C_nH_{2n})_m\text{-}A^1\text{-}H \qquad (I)$$

where $R^1$ is a monovalent, optionally substituted hydrocarbon radical to which Si—H groups can be added in a hydrosilylation reaction, preferably a hydrocarbon radical containing an aliphatic multiple C—C bond, A is a divalent, polar organic radical selected from the group of —O—, —C(O)—O—, —O—C(O)—, —O—C(O)—O—, —C(O)—NH—, —NH—C(O)—, urethane radical and urea radical, preferably an oxygen atom —O—, $A^1$ is a divalent, polar organic radical selected from the group of —O—, —NH— and —NR'— (where R' is a monovalent hydrocarbon radical having 1 to 18 carbon atoms), preferably an oxygen atom —O—, n is an integer from 1 to 20, preferably 1 to 4, more preferably 2 or 3, and m is a positive integer, preferably 5 to 50, and reacting in a second step the resultant intermediates (4), containing H-$A^1$ groups, with organic compounds (5) which have per molecule at least two isocyanate groups, with the proviso that the water content of the compounds (1) and (2) used for preparing the polysiloxane copolymers is lower than 2000 ppm by weight, preferably lower than 1500 ppm by weight, more preferably lower than 1000 ppm by weight, based in each case on the total weight of compounds (1) and (2).

The water content relates to room temperature (20° C.) and to the pressure of the surrounding atmosphere (1020 hPa).

The polysiloxane copolymers of the invention preferably possess a viscosity of 1000 to 100,000,000 mPa·s at 25° C., more preferably 1000 to 10,000,000 mPa·s at 250° C.

For the activity of the defoamer formulation of the invention, the polysiloxane copolymer (B) of the invention that is used is of critical importance.

The defoamer formulations preferably contain 0.1% to 75% by weight, more preferably 0.1% to 50% by weight, and most preferably 1.5% to 50% by weight, of the polysiloxane copolymers (B) of the invention.

The polysiloxane copolymers (B) of the invention are obtained as follows:

in the first process step the organopolysiloxanes (1) used are preferably linear, cyclic or branched organopolysiloxanes composed of units of the general formula $$R_e H_f SiO_{\frac{4-e-f}{2}}, \qquad (II)$$

where

R may be identical or different and denotes a monovalent, unsubstituted or substituted hydrocarbon radical having 1 to 18 carbon atoms per radical, e is 0, 1, 2 or 3, f is 0, 1 or 2, and the sum of e+f is 0, 1, 2 or 3, with the proviso that there is at least one Si-bonded hydrogen atom, preferably at least 2 Si-bonded hydrogen atoms, per molecule.

As organopolysiloxanes (1) it is preferred to use those of the general formula $$H_g R_{3-g} SiO(SiR_2O)_o(SiRHO)_p SiR_{3-g} H_g \qquad (III)$$

where R is as defined for it above, g is 0, 1 or 2, o is 0 or an integer from 1 to 1500, and p is 0 or an integer from 1 to 200, with the proviso that there is at least one Si-bonded hydrogen atom, preferably at least two Si-bonded hydrogen atoms, per molecule.

For the purposes of this invention formula (III) is to be understood such that o units —(SiR$_2$O)— and p units —(SiRHO)— can be distributed in any desired way in the organopolysiloxane molecule.

With particular preference g in the formula (III) 0 and p in the formula (III) is 3 to 10 and organopolysiloxanes (1) used are copolymers comprising hydrogenalkylsiloxy and dialkylsiloxy units, more particularly copolymers comprising hydrogenmethylsiloxy and dimethylsiloxy units.

The organopolysiloxanes (1) preferably possess an average viscosity of 10 to 1000 mPa·s at 25° C., more preferably 50 to 1000 mPa·s at 25° C., and with particular preference 60 to 600 mPa·s at 25° C.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methyl-cyclohexyl radicals; aryl radicals such as the phenyl, naphthyl, anthryl, and phenanthryl radicals; alkaryl radicals such as o-, m-, p-tolyl radicals, xylyl radicals, and ethylphenyl radicals; and aralkyl radicals such as the benzyl radical, and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o-, m-, and p-chlorophenyl radicals.

The radical R is preferably a monovalent hydrocarbon radical having 1 to 6 carbon atoms, the methyl radical being particularly preferred.

Examples of radicals R apply fully to radicals R'.

R$^1$ is preferably a monovalent hydrocarbon radical with an aliphatic multiple C—C bond. Examples of radicals R$^1$ are alkenyl radicals, such as the vinyl, 5-hexenyl, cyclohexenyl, 1-propenyl, allyl, 3-butenyl, and 4-pentenyl radicals, and alkynyl radicals such as the ethynyl, propargyl, and 1-propynyl radicals. R$^1$ is preferably an alkenyl radical, more particularly an ω-alkenyl radical, the allyl radical being particularly preferred.

Preferred oligomeric or polymeric compounds (2) are polyethers of the general formula $$H_2C=CH-R^2-(OC_nH_{2n})_m-OH \qquad (IV),$$

where R$^2$ is a divalent hydrocarbon radical having 1 to 10 carbon atoms, preferably a radical of the formula —CH$_2$—, —CH(CH$_3$)— or —C(CH$_3$)$_2$—, and n and m are as defined above for them.

Preferred examples of polyethers (2) are those of the general formula $$H_2C=CH-R^2-(OCH_2CH_2)_a[OCH_2CH(CH_3)]_b-OH \qquad (IV'),$$

where R$^2$ is as defined above for it and a and b are 0 or an integer from 1 to 200, preferably 5 to 50.

Further examples of oligomeric or polymeric compounds (2) are unsaturated polyesters, such as H$_2$C=CH—R$^2$—[O(O)CC$_n$H$_{2n}$]$_m$—OH, unsaturated polycarbonates, such as H$_2$C=CH—R$^2$—[OC(O)OC$_n$H$_{2n}$]$_m$—OH, and unsaturated polyamides, such as H$_2$C=CH—R$^2$—[NHC(O)C$_n$H$_{2n}$]$_m$—NH$_2$, where R$^2$, n, and m are as defined above for them.

In the first process step the compounds (2) are preferably used in amounts of 1.0 to 4.0, more preferably 1.3 to 2.5, mol of radical R$^1$, which is preferably a radical with an aliphatic multiple C—C bond, more preferably an ω-alkenyl radical, per gram atom of Si-bonded hydrogen in the organopolysiloxane (1).

In the first process step it is preferred to use catalysts (3) which promote the addition of Si-bonded hydrogen to aliphatic multiple bond. As catalysts (3) it is also possible in the process of the invention to employ any catalysts which promotes the addition of Si-bonded hydrogen to an aliphatic multiple bond. The catalysts are preferably a metal from the group of the platinum metals, or a compound or a complex from the group of the platinum metals. Examples of such catalysts are metallic and finely divided platinum, which may be present on supports such as silica, alumina or activated carbon, or compounds or complexes of platinum, such as platinum halides, e.g., PtCl$_4$, H$_2$PtCl$_6$.6H$_2$O, Na$_2$PtCl$_4$.4H$_2$O, platinum-olefin complexes, platinum-alcohol complexes, platinum-alkoxide complexes, platinum-ether complexes, platinum-aldehyde complexes, platinum-ketone complexes, including reaction products of H$_2$PtCl$_6$.6H$_2$O and cyclohexanone, platinum-vinyl siloxane complexes, such as platinum-1,3-divinyl-1,1,3,3-tetramethyldisiloxane complexes with or without detectable inorganically bonded halogen present, bis(gamma-picoline)platinum dichloride, trimethylenedipyridineplatinum dichloride, dicyclopentadieneplatinum dichloride, dimethyl sulfoxy-ethylene-platinum (II) dichloride, cyclooctadiene-platinum dichloride, norbornadiene-platinum dichloride, gamma-picoline-platinum dichloride, cyclopentadiene-platinum dichloride, and also reaction products of platinum tetrachloride with olefin and primary amine or secondary amine or both primary and secondary amine, such as the reaction product of platinum tetrachloride in solution in 1-octene, with sec-butylamine, or ammonium-platinum complexes.

In the first process step the catalyst (3) is preferably used in amounts of 1 to 50 ppm by weight (parts by weight per million parts by weight), preferably in amounts of 2 to 20 ppm by weight, calculated in each case as elemental platinum and based on the total weight of the organopolysiloxanes (1) and compounds (2).

The first process step is preferably carried out under the pressure of the surrounding atmosphere, i.e., for instance, at 1020 hPa (abs.) but can also be carried out under higher or lower pressures. The first process step, moreover, is preferably carried out at a temperature of 60° C. to 140° C., more preferably 80° C. to 120° C.

In the second process step use is made as organic compounds (5) which contain at least two isocyanate groups per molecule preferably of those of the general formula

$$O=C=N-R^3-N=C=O \quad (V),$$

where $R^3$ is a divalent hydrocarbon radical having from 4 to 40 carbon atoms per radical.

Examples of organic compounds (5) are hexamethylene 1,6-diisocyanate, isophorone diisocyanate, tolylene 2,4-diisocyanate, tolylene 2,6-diisocyanate, phenylene 1,3-diisocyanate, 4,4'-methylene bis(cyclohexyl-isocyanate), 4,4'-methylene bis(phenylisocyanate), and dimethylphenyl diisocyanate.

Organic compounds (5) are used in the second process step preferably in amounts of 0.1 to 0.9 mol, more preferably 0.2 to 0.7 mol, of isocyanate group per mole of H-$A^1$ group in the intermediate (4).

For the reaction in the second step of the process of the invention it is preferred to use condensation catalysts (6), such as di-n-butyltin dilaurate, tin (II) octoate, dibutyltin diacetate, potassium octoate or tertiary amines, such as dimethylcyclohexylamine, dimethylaminopropyldipropanolamine, pentamethyl-dipropylenetriamine, N-methylimidazole or N-ethylmorpholine.

One preferred polysiloxane copolymer is obtained by reacting, in the first process step, a methyl-terminated hydrogen-functional polysiloxane (1) containing pendent Si-bonded hydrogen atoms with an excess of polyether (2) of the formula (IV), and in the second process step reacting the intermediate (4), a silicone polyether with comb structure, with a diisocyanate (5) of the formula (V), with urethane groups being introduced into the polysiloxane copolymer. Free polyether from the 1st step is also bound by urethane formulation in this reaction.

The urethane groups in the hydrophilic polysiloxane copolymers of the invention are able to act as donors and acceptors in the context of the formation of hydrogen bonds.

In the second step of the process of the invention it is possible, in addition to the organic compounds (5), to use further compounds (7) which are reactive toward isocyanate groups. Examples of further compounds (7) are those selected from the group of the formulae

$$R^4\text{-}(A\text{-}C_nH_{2n})_m\text{-}A^1\text{-}H \quad (VII),$$

$$HO-R^5-NR^4-R^5-OH \quad (VIII),$$

$$HO-R^5-NR^4_2 \quad (IX),$$

$$HO-R^6(NR^4_2)_2 \quad (X),$$

$$HO-R^7(NR^4_2)_3 \quad (XI)$$

$$(HO)_2R^6-NR^4_2 \quad (XII), \text{ and}$$

$$HNR^4_2 \quad (XIII),$$

where $R^4$ is a hydrogen atom or a radical R, which may optionally contain one or more nitrogen atoms, $R^5$ is a divalent hydrocarbon radical having 1 to 10 carbon atoms per radical, $R^6$ is a trivalent organic radical having 1 to 100 carbon atoms per radical, preferably a trivalent hydrocarbon radical having 1 to 100 carbon atoms and containing one or more oxygen atoms, $R^7$ is a tetravalent organic radical having 1 to 100 carbon atoms per radical, preferably a tetravalent hydrocarbon radical having 1 to 100 carbon atoms and containing one or more oxygen atoms, and $A^1$, n, and m have the definition specified for them above.

Examples of compounds of the formula (VII) are polyoxyethylene glycol monomethyl ether, polyoxyethylene glycol monobutyl ether, polyoxyethylene polyoxypropylene glycol monomethyl ether, and polyoxypropylene glycol monomethyl ether.

Examples of compounds of the formula (VIII) are N-methyldiethanolamine, N-methyldipropanolamine, dimethylaminopropyldipropanolamine, N-dodecyldiethanol-amine and N-stearyldipropanolamine.

Examples of compounds of the formula (IX) are N,N-dimethylethanolamine, N,N-diethylpropanolamine, N,N-dimethylaminopropylmethylethanolamine and dimethyl-2-(2-aminoethoxy)ethanol.

Examples of compounds of the formula (X) are 1,5-bis (dimethylamino)pentan-3-ol, 1,5-bis(methylamino)-pentan-3-ol, 1,7-bis(dimethylamino)heptan-4-ol and N,N-bis-(3-dimethylaminopropyl)-N isopropanolamine.

Examples of compounds of the formula (XI) are 2,4,6-tris (dimethylaminomethyl)phenol, 1,1,1-tris(dimethyl-aminomethyl)methanol, and 2,4,6-tris(dimethylamino-methyl) cyclohexanol.

Examples of compounds of the formula (XII) are N,N-bis (dimethylaminopropyl)-3-aminopropane-1,2-diol, N,N-bis (dimethylaminopropyl)-2-aminopropane-1,3-diol, N,N-bis (3-dimethylaminopropyl)carbamino acid monoglyceride.

Examples of compounds of the formula (XIII) are dibutylamine, octylamine, benzylamine, 3-(cyclohexyl-amino)propylamine, 2-(diethylamino)ethylamine, diprop-ylenetriamine, isophoronediamine, dimethylaminopropylmethylamine, aminopropylmorpholine, N,N-bis-(dimethylaminopropyl)amine, dimethylaminopropylamine.

Compounds of the formula (VIII) to (XIII) afford an opportunity to incorporate protonatable nitrogen in the polysiloxane copolymer.

Compounds of the formula (VII) are used in the second process step in amounts of preferably 0 to 2 mol, more preferably 0 to 1 mol, of H-$A^1$ group per mole of H-$A^1$ group in the compound (2).

Compounds of the formula (VIII) are used in the second process step in amounts of preferably 0 to 2 mol, more preferably 0 to 1 mol, of HO group per mole of H-$A^1$ group in the compound (2).

Compounds of the formula (IX) are used in the second process step in amounts of preferably 0 to 2 mol, more preferably 0 to 1 mol, of HO group per mole of H-A$^1$ group in the compound (2).

Compounds of the formula (X) are used in the second process step in amounts of preferably 0 to 2 mol, more preferably 0 to 1 mol, of HO group per mole of H-A$^1$ group in the compound (2).

Compounds of the formula (XI) are used in the second process step in amounts of preferably 0 to 2 mol, more preferably 0 to 1 mol, of HO group per mole of H-A$^1$ group in the compound (2).

Compounds of the formula (XII) are used in the second process step in amounts of preferably 0 to 2 mol, more preferably 0 to 1 mol, of HO group per mole of H-A$^1$ group in the compound (2).

Compounds of the formula (XIII) are used in the second process step in amounts of preferably 0 to 2 mol, more preferably 0 to 1 mol, of HN group per mole of H-A$^1$ group in the compound (2).

When compounds (7) are used, as well, polyisocyanate (5) is preferably employed in a deficit amount, in order to ensure that the isocyanate groups, which are a potential hazard to health, are safely consumed by reaction. In the second process step, therefore, organic compounds (5) are used preferably in amounts of 0.1 to 0.9 mol, more preferably 0.2 to 0.7 mol, of isocyanate group per mole of the sum of isocyanato-reactive functions from the sum of intermediate (4) and compounds (7).

The second process step is preferably carried out under the pressure of the surrounding atmosphere, i.e., approximately at 1020 hpa (abs.) but can also be carried out under higher or lower pressures. The second process step, moreover, is preferably carried out at a temperature of 40° C. to 160° C., more preferably 80° C. to 140° C.

In order to lower the product viscosities, which are in some cases very high, it is possible, if desired, to add substances of low molecular weight, such as alcohols or ethers. Examples of such are ethanol, isopropanol, n-butanol, 2-butoxyethanol, diethylene glycol monobutyl ether, tetraethylene glycol monohexyl ether, hexaethylene glycol monooctyl ether, tetrahydrofuran, diethylene glycol diethyl ether, and dimethoxyethane, with tetraethylene glycol monohexyl ether being a preferred example. Preferred amounts added in the case of very viscous products are up to 50% by weight, more preferably up to 30% by weight, based on the hydrophilic polysiloxane copolymers of the invention. Additions of this kind have the advantage, furthermore, that the resultant products are more readily dispersible in water than are the pure polysiloxane copolymers.

The defoamer formulations of the invention may further comprise polyether-polysiloxane copolymers (F), of the kind described, for example, in DE A 102 55 649, EP A 663 225, and EP A 10760703. The polyether-polysiloxane copolymers (F) can be blended with the polysiloxane copolymers (B) of the invention. In the defoamer formulations of the invention the polyether-polysiloxane copolymers (F) are preferably used in amounts of 0% to 30% by weight, based on the total weight of the defoamer formulation.

The defoamer formulations of the invention preferably comprise
(A) 1% to 90% by weight of siloxane-based antifoams,
(B) 0.1% to 50% by weight of the polysiloxane copolymer of the invention,
(C) 0% to 20% by weight, preferably 2% to 20% by weight of emulsifiers,
(D) 0% to 97% by weight of water, based in each case on the total weight of the defoamer formulations, and optionally
(E) preservatives, thickeners, and further additions.

As siloxane-based antifoam (also referred to below as siloxane defoamer) it is customary to use a mixture of silica and polyorganosiloxanes, the mixture containing preferably
(aa) 1% to 15% by weight of a precipitated and/or fumed silica hydrophobized in situ and having a BET surface area of greater than 50 g/m$^2$, and/or a pretreated, hydrophobic, precipitated and/or fumed silica having a BET surface area greater than 50 g/m$^2$,
(ab) 20% to 99% by weight of one or more polyorganosiloxanes composed of units of the general formula

$$R^8_e(R^9O)_d SiO_{(4-e-d)/2} \qquad (XIV),$$

in which R can be identical or different and denotes a monovalent, substituted and/or unsubstituted saturated and/or unsaturated hydrocarbon radical having 1 to 30 carbon atoms per radical,
R$^9$ can be identical or different and denotes a hydrogen atom or a monovalent, substituted and/or unsubstituted saturated and/or unsaturated hydrocarbon radical having 1 to 30 carbon atoms per radical,
d is 0, 1, 2 or 3, with d being on average a figure of less than 0.5,
e is 0, 1, 2 or 3,
with the proviso that the sum (d+e) is <3 and has on average a value of 1.8 to 2.4,
(ac) 0% to 10% by weight of a silicone resin which is composed substantially of units of the general formula R$_3$SiO$_{1/2}$ and SiO$_{4/2}$, where R is as defined above for it, and
(ad) 0% to 80% by weight of an organic compound having a boiling point greater than 100° C., selected from mineral oils, natural oils, isoparaffins, polyisobutylenes, residues from the oxo process of alcohol synthesis, esters of low molecular mass synthetic carboxylic acids, ethers of low molecular mass alcohols, phthalates, and esters of phosphoric acid, the % by weight being based in each case on the total weight of the antifoam.

The in situ hydrophobization of the silica (aa) can be accomplished by heating the silica, in dispersion in the polyorganosiloxane (ab), at temperatures from 100 to 200° C. for a number of hours. This reaction can be assisted by the addition of catalysts, such as KOH, and of hydrophobizing agents, such as short-chain OH-terminated polydimethylsiloxanes, silanes, silazanes or silicone resins. An alternative employed can be pretreated, hydrophobized silicas, or else a combination of silicas hydrophobized in situ with pretreated hydrophobized silicas.

Examples of radicals R$^8$ in the general formula (II) are unsubstituted, branched or unbranched alkyl radicals such as methyl, ethyl, propyl, isopropyl, hexyl, 2-ethylhexyl, octyl or dodecyl radicals; substituted alkyl radicals such as trifluoropropyl, cyanoethyl, glycidyloxypropyl, polyalkylene glycolpropyl, aminopropyl or aminoethylaminopropyl radicals; unsaturated radicals such as vinyl, methacryloyloxypropyl or allyl radicals; aromatic radicals such as phenyl, tolyl, xylyl, naphthyl, anthracyl or benzyl radicals. Particularly preferred radicals R$^8$ are the methyl or phenyl radical, it being particularly preferred if more than 80 mol % of the radicals R$^8$ are methyl radicals.

Examples of radicals R$^9$ in the general formula (II) are unsubstituted, branched or unbranched alkyl radicals such as methyl, ethyl, propyl, isopropyl, hexyl, 2-ethylhexyl, octyl or dodecyl radicals; substituted alkyl radicals such as trifluoropropyl, cyanoethyl, glycidyloxypropyl, polyalkylene glycolpropyl, aminopropyl or aminoethylaminopropyl radicals; unsaturated radicals such as vinyl, methacryloyloxypropyl or allyl radicals; or aromatic radicals such as phenyl, tolyl, xylyl, naphthyl, anthracyl or benzyl radicals.

Examples of compounds of the formula (XIV) are polydimethylsiloxanes having viscosities of 100 to 1,000,000 mPa·s at 25° C. These polydimethylsiloxanes may be branched due for example to the incorporation of $CH_3SiO_{3/2}$ or $SiO_{4/2}$ units. These branched or incipiently crosslinked siloxanes then have viscoelastic properties.

Branched viscoelastic polyorganosiloxanes of this kind can be obtained, for example, by reacting the product of dimethyldichlorosilane hydrolysis or by reacting hydroxy-terminated polydimethylsiloxanes with a trimethylsilyl-terminated polydimethylsiloxane and with a compound selected from a silyl having at least three hydrolyzable groups, such as tetraethoxysilane, methyltrimethoxysilane or methyltriacetoxysilane, or with a silicone resin which is constructed substantially of $(CH_3)_3SiO_{1/2}$ and $SiO_2$ units in a ratio of 2:1 to 1:2, in the presence of a catalyst.

A further variant for the preparation of branched viscoelastic polyorganosiloxanes is the reaction of an organosiloxane $X^1$ having on average less than 2, randomly distributed functional groups per molecule with an organosiloxane $X^2$ having on average more than 2, randomly distributed functional groups per molecule, there being only one kind of functional groups per siloxane $X^1$ or $X^2$ in each case, in the presence of a catalyst that promotes hydrosilylations, such as platinum or platinum compounds, for example.

The siloxane-based antifoam may further contain 0.1% to 10% by weight, preferably 0.5% to 5% by weight, of at least one polyorganosiloxane (ab') of the general formula (XIV), in which $R^8$ denotes a methyl radical and $R^9$ denotes a linear and/or branched hydrocarbon radical having at least 6 carbon atoms, d adopts a value of 0.005 to 0.5, and the sum (d+e) adopts a value of 1.9 to 2.1. Products of this kind are accessible, for example, through alkali-catalyzed condensation of silanol-terminated polydimethylsiloxanes with a viscosity of 50 to 50,000 mPa·s at 25° C. and aliphatic alcohols having more than 6 carbon atoms, such as isotridecyl alcohol, n-octanol, stearyl alcohol, 4-ethylhexadecanol or eicosanol.

In the defoamer formulations of the invention there may be further known additions or auxiliaries present, examples being further fillers such as alumina, metal soaps, hydrophobized, finely ground quartz, or finely divided hydrophobic polyurethanes. Also possible, however, is the addition of substances which act as defoamer oils, such as mineral oils, liquid paraffins, fatty acid esters, fatty alcohols, and waxes, in amounts of 1% to 99% by weight, based on the total weight of the formulation. In addition it is possible to add compounds known as thickeners, such as polyacrylic acid, polyacrylates, cellulose ethers such as carboxymethylcellulose and hydroxyethylcellulose, natural gums such as xanthan gum, and polyurethanes.

The defoamer formulation of the invention is produced by known processes, as for example by employing high shearing forces in colloid mills or rotor-stator homogenizers. This mixing operation may take place under reduced pressure, in order to prevent air which is present in highly dispersed fillers being incorporated by mixing.

Preference is given to the use of the defoamer formulations of the invention in oil-in-water emulsions (O/W emulsions). The specific polysiloxane copolymers used in the defoamer formulations of the invention have surfactant properties, and are therefore also suitable for use as emulsifiers for the formation of oil-in-water emulsions, starting from antifoams based on siloxanes. The defoamer formulations, if used as emulsions, can further be admixed with additional organic emulsifiers which are able to form o/W emulsions on the basis of siloxanes.

The polysiloxane copolymers (B) can be emulsified together with the antifoam (A), or the polysiloxane copolymers (B) can simply be added, after the preparation of an emulsion from the antifoam (A) to the antifoam emulsion directly or in the form of an emulsion, in order to achieve an improved activity.

The defoamer formulations of the invention in the form of O/W emulsions preferably contain (A) 5% to 50% by weight of siloxane-based antifoams, (B) 0.1% to 30% by weight of the polysiloxane copolymer of the invention, (C) 2% to 20% by weight of an emulsifier, and (D) 50% to 95% by weight of water, based in each case on the total weight of the defoamer formulations, and optionally (E) preservatives, thickeners, and further additives.

The emulsifiers needed for the preparation of the emulsions may be anionic, cationic or nonionic and are known to the skilled worker for the purpose of preparing stable silicone emulsions. Preference is given to using emulsifier mixtures, which ought to contain at least one nonionic emulsifier, such as sorbitan fatty acid esters, ethoxylated sorbitan fatty acid esters, ethoxylated fatty acids, ethoxylated linear or branched alcohols having 10 to 20 carbon atoms and/or glycerol esters, for example.

Technologies for the preparation of silicone emulsions are known. Typically the preparation takes place by the simple stirring together of all of the ingredients and their subsequent homogenization using rotor-stator homogenizers, colloid mills or high-pressure homogenizers.

The defoamer formulations of the invention can be employed wherever operations are subject to disruptive foaming which is to be lessened or eliminated completely. Such applications are, for example, in laundry and cleaning detergents, the control of foam in waste water plants, textile dye processes, in connection with the scrubbing of natural gas, in dispersions, and in hydrocarbons.

More particularly the defoamer formulations of the invention can be employed to outstanding effect for defoaming aqueous media that are obtained during pulp production.

WORKING EXAMPLES

All of the parts and percentages below (unless otherwise indicated) are based on weight. The viscosities are measured at 25° C.

(A) Preparation of the Siloxane Defoamers

A1: 94 parts of polydimethylsiloxane with a viscosity of 12,500 mm$^2$/s and 6 parts of a hydrophilic silica were homogenized three times using a colloid mill (0.6 mm slot). The silica was hydrophobized in situ by heating of the mixture at 190° C. for 10 hours.

A2: 400 parts of a hydroxy-terminated polydimethylsiloxane with a viscosity of 65 mm$^2$/s, 40 parts of trimethylsiloxy-terminated polydimethylsiloxane with a viscosity of 40 mm$^2$/s, 4 parts of methyltrimethoxysilane, and 1 part of a 0.5% phosphorus nitride chloride catalyst were heated to 100° C. Over the course of 20 minutes the pressure was lowered to 35 mbar. Thereafter the catalyst was neutralized with 0.03 part of triisooctylamine. The polyorganosiloxane obtained had a viscosity of 19,000 mm²/s. Incorporated into 95 parts of this oil were 5 parts of a pretreated hydrophobic silica, and the mixture was homogenized using a colloid mill.

A3: A mixture of 89.3 parts of a trimethylsiloxy-terminated polydimethylsiloxane with a viscosity of 5000 mm²/s, 5 parts of a fumed hydrophilic silica having a BET surface area of 300 m²/g, 0.7 part of a 20% strength methanolic KOH, 2.5 parts of a silicone resin composed of 40 mol % of trimethylsiloxy units and 60 mol % of $SiO_{4/2}$ units, and 2.5 parts of a siloxane prepared by condensing eicosanol with a hydroxy-terminated polydimethylsiloxane with a viscosity of 65 mm²/s was heated at 150° C. for 2 h. After cooling, the mixture was homogenized using a colloid mill.

(B) Preparation of the Polysiloxane Copolymers

Preparation of the Inventive Polysiloxane Copolymer

Polymer 1

67 g of a siloxane terminated with methyl groups and composed of dimethylsiloxy and hydrogen methylsiloxy units, having an active hydrogen content of 0.133% and a viscosity of 72 mm²/s (25° C.), are mixed, with vigorous stirring, with 408 g of an allyl polyether (560 ppm $H_2O$ content) having a PO/EO ratio of 4.0 and an iodine number of 11.2, and the mixture is heated to 100° C. The hydrosilylation is initiated by adding 0.5 ml of a 2% strength solution of hexachloroplatinic acid and isopropanol, and is manifested in a slightly exothermic reaction. The reaction mixture is held at 100-110° C. until a clear copolymer is obtained and until active hydrogen is no longer detectable. The intermediate has a viscosity of 870 mm²/s (25° C.).

Heating takes place further to 130° C., and traces of water are removed under reduced pressure. Thereafter 7 g of hexamethylene diisocyanate are metered in and the mixture is homogenized for 20 minutes. The isocyanate reaction is initiated with one drop of DBTL. After 2 hours the NCO content has fallen below the detection limit (IR: 20 ppm), and so 120 g of Emulan® HE 50 emulsifier (BASF) are metered in. The 80% strength copolymer solution has a viscosity after cooling to 25° C. of 2100 mm²/s and a urethane content of 0.139 meq/g.

Comparative Experiment

Polymer 2

As polymer 2 use was made of a commercial unbranched polyether-polysiloxane copolymer having a viscosity of 800 mPa·s at 25° C. and a cloud point of 30° C.

Comparative Example (Polymer 3) According to EP-A 1 076 073

As polymer 3 use was made of a polymer corresponding to example B3 from EP-A 1 076 073.

Comparative Example (Polymer 4) According to DE-A 10255649

As polymer 4 use was made of a polymer corresponding to polymer 1 from DE-A 10255649.

(C) Preparation and Testing of the Defoamer Formulations

Testing of Activity (Black Liquor Test):

400 ml of black liquor (hardwood from the processing of birch) were conditioned to 80° C. using a thermostat in a 1 l measuring cylinder with a wash bottle attachment for 15 minutes. After the addition of 10 mg of organosilicon polymers (the sum of silicone defoamer A and polysiloxane copolymer B) in the form of the prepared defoamer formulation, the black liquor was pumped in circulation at a rate of 2.3 l/min; whenever (a total of 3 times) a height of 30 cm of foam was reached in the measuring cylinder, 5 mg of silicone were added immediately (a total of 25 mg of silicone). A measurement was made of the time t between the start of the test and the time after the final addition when the foam had risen again to 30 cm.

The longer this time t, the more active the defoamer.

Examples 1 to 3

(C11, C12, C13) and Also Comparative Experiments 1 and 2 (CV11, CV12, and CV13)

The inventive defoamer formulations C11, C12, C13 and the defoamer formulations CV11, CV12, and CV13 in accordance with comparative experiments were prepared by simply mixing 90 parts of the silicone defoamer specified in the table with 10 parts of the polysiloxane copolymer specified in the table, using a laboratory dissolver. For testing, a mixture of 20 parts of this defoamer formulation and 80 parts of a mixture of aliphatic hydrocarbons with a viscosity of 3 mm²/s and a flash point >100° C. was prepared using a laboratory dissolver at 1000 min⁻¹.

The results of the activity testing are summarized in the table.

Examples 4 to 6

(C21, C22, C23) and Comparative Experiments 3 to 5 (CV21, CV22, CV23, and CV24)

For the preparation of the inventive defoamer formulations C21, C22, and C23 and the defoamer formulations CV21, CV22, CV23, and CV24 according to comparative experiments, 20 parts of the silicone defoamer specified in the table, 5 parts of sorbitan monostearate, 5 parts of polyoxyethylene (40) stearate, and 5 parts of the polysiloxane copolymer specified in the table were mixed at 70° C. 10 parts of a 1% strength solution of xanthan gum, with 0.5% of formaldehyde as preservative, were stirred in using a surface stirrer at 600 min⁻¹. Over the course of 3 minutes, 55 parts of water were added, in portions, followed by stirring at 1000 min⁻¹ for 15 minutes.

The results of activity testing are summarized in the table.

Examples 7 to 9

(C31, C32, and C33) and Comparative Experiments 6 and 7 (CV31, CV32, and CV33)

For the preparation of the inventive defoamer formulations C31, C32, and C33 and also of the defoamer formulations CV31, CV32, and CV33 according to comparative experiments, 20 parts of the siloxane defoamer specified in the table, 4 parts of polyoxyethylene(4) stearate and 2 parts of polyoxyethylene(40) stearate were mixed at 70° C. Over the course of 10 minutes, 69 parts of water were added in portions. Finally the resulting emulsion was admixed with 5 parts of the polysiloxane copolymer specified in the table, and stirring was carried out subsequently at 1000 min$^{-1}$ for 15 minutes.

The results of the activity testing are summarized in the table.

| Example or comparative experiment | Silicone defoamer | Polysiloxane copolymer | Black liquor test, t in s |
|---|---|---|---|
| C11 | A1 | Polymer 1 | 2040 |
| C12 | A2 | Polymer 1 | 2560 |
| C13 | A3 | Polymer 1 | 3190 |
| CV11 not inventive | A3 | Polymer 2 | 905 |
| CV12 not inventive | A3 | Polymer 3 | 1610 |
| CV13 not inventive | A3 | Polymer 4 | 1650 |
| C21 | A1 | Polymer 1 | 4160 |
| C22 | A2 | Polymer 1 | 5470 |
| C23 | A3 | Polymer 1 | 7920 |
| CV21 not inventive | A1 | none | 605 |
| CV22 not inventive | A1 | Polymer 2 | 1780 |
| CV23 not inventive | A1 | Polymer 3 | 2710 |
| CV24 not inventive | A1 | Polymer 4 | 2850 |
| C31 | A1 | Polymer 1 | 4620 |
| C32 | A2 | Polymer 1 | 5715 |
| C33 | A3 | Polymer 1 | 6505 |
| CV31 not inventive | A3 | none | 550 |
| CV32 not inventive | A3 | Polymer 3 | 2565 |
| CV33 not inventive | A3 | Polymer 4 | 2700 |

The markedly improved activity of the defoamer formulations of the invention as compared with the prior art (comparative experiments) is obvious on the basis of the substantially higher figures for t.

Repetition of the defoamer test in a softwood black liquor (pine) confirmed the outstanding activity of the defoamer formulations of the invention.

The invention claimed is:

1. A defoamer formulation comprising
   (A) siloxane-based antifoams and
   (B) polysiloxane copolymers prepared by reacting
   in a first step
   organopolysiloxanes (1) which have per molecule at least one Si-bonded hydrogen atom, with substantially linear oligomeric or polymeric compounds (2) of the formula $$R^1\text{-}(A\text{-}C_nH_{2n})_m\text{-}A^1\text{-}H \quad (I),$$

where $R^1$ is a monovalent hydrocarbon radical to which Si—H groups can be added in a hydrosilylation reaction,
A is —O—,
$A^1$ is —O—,
n is an integer from 1 to 20, and
m is a positive integer, to form an intermediate (4);
and, in a second step, reacting the intermediate (4), containing H-$A^1$ groups, with organic compounds (5) which have per molecule at least two isocyanate groups,
with the proviso that the water content of the compounds (1) and (2) used for preparing the polysiloxane copolymers is lower than 2000 ppm by weight, based on the total weight of compounds (1) and (2).

2. The defoamer composition of claim 1, wherein at least one organopolysiloxane (1) contains per molecule at least two Si-bonded hydrogen atoms.

3. The defoamer formulation of claim 1, wherein the defoamer formulation contains 0.1% to 50% by weight of polysiloxane copolymers (B).

4. The defoamer formulation of claim 1, wherein the organic compounds (5) which have per molecule at least two isocyanate groups are used in amounts of 0.1 to 0.9 mol of isocyanate group per mole of H-$A^1$-group in the intermediate (4).

5. The defoamer formulation of claim 1, wherein organopolysiloxanes (1) comprise those of the formula $$H_gR_{3-g}SiO(SiR_2O)_o(SiRHO)_pSiR_{3-g}H_g \quad (III)$$

where R are identical or different and are monovalent, optionally substituted hydrocarbon radicals having 1 to 18 carbon atoms per radical,
g is 0, 1 or 2,
o is 0 or an integer from 1 to 1500, and
p is 0 or an integer from 1 to 200,
with the proviso that there is at least one Si-bonded hydrogen atom per molecule.

6. The defoamer formulation of claim 1, wherein the organopolysiloxanes (1) are α-ω-dihydrogendiorganopolysiloxanes.

7. The defoamer formulation of claim 1, wherein the compound (2) is an aliphatically unsaturated alcohol of the formula $$H_2C=CH\text{—}R^2(OC_nH_{2n})_m\text{—}OH \quad (IV),$$

where $R^2$ is a divalent hydrocarbon radical having 1 to 10 carbon atoms,
n is an integer from 1 to 20, and m is a positive integer.

8. The defoamer formulation of claim 1, wherein the compound (5) is a diisocyanate of the formula $$O=C=N\text{—}R^3\text{—}N=C=O \quad (V),$$

where $R^3$ is a divalent hydrocarbon radical having from 4 to 40 carbon atoms per radical.

9. The defoamer formulation of claim 1, wherein in the second step, at least one further compound (7) is present, the compound(s) (7) selected from the group consisting of the formulae $$R^4\text{-}(A\text{-}C_nH_{2n})_m\text{-}A^1\text{-}H \quad (VII),$$

$$HO\text{—}R^5\text{—}NR^4\text{—}R^5\text{—}OH \quad (VIII),$$

$$HO\text{—}R^5\text{—}NR^4_2 \quad (IX),$$

$$HO\text{—}R^6(NR^4_2)_2 \quad (X),$$

$$HO\text{—}R^7(NR^4_2)_3 \quad (XI),$$

$$(HO)_2R^6\text{—}NR^4_2 \quad (XII), \text{and}$$

$$HNR^4_2 \quad (XIII),$$

where $R^4$ is a hydrogen atom or a radical R where R are identical or different and are monovalent, which may optionally contain a nitrogen atom,
$R^5$ is a divalent hydrocarbon radical having 1 to 10 carbon atoms per radical,
$R^6$ is a trivalent organic radical having 1 to 100 carbon atoms per radical,
$R^7$ is a tetravalent organic radical having 1 to 100 carbon atoms per radical,
$A^1$ comprises a divalent, polar organic radical selected from the group consisting of —OH—, —NH—, —NR'—, and mixtures thereof where $R^1$ is a monovalent hydrocarbon radical having 1 to 18 carbon atoms,
n is an integer from 1 to 20, and
m is a positive integer, to form an intermediate (4).

10. The defoamer formulation of claim 9, wherein the organic compounds (5) are used in amounts of 0.1 to 0.9 mol of isocyanate group per mole of the sum of groups that react with isocyanate groups, from the sum of intermediate (4) and compounds (7).

11. The defoamer formulation of claim 1, wherein the polysiloxane copolymers (B) are used in the form of aqueous emulsions or microemulsions.

12. The defoamer formulation of claim 1, further comprising (F), one or more polyether-polysiloxane copolymers.

13. The defoamer formulation of claim 1, further comprising
   (A) 1% to 90% by weight of siloxane-based antifoams,
   (C) 0% to 20% by weight, preferably 2% to 20% by weight of emulsifiers,
   (D) 0% to 97% by weight of water, based in each case on the total weight of the defoamer formulation, wherein the polysiloxane copolymers (B) of claim 1 is present in an amount of 0.1% to 50% by weight of the defoamer formulation
   (E) preservatives, thickeners, and further additives.

14. The defoamer formulation of claim 9, further comprising
   (A) 1% to 90% by weight of siloxane-based antifoams,
   (C) 0% to 20% by weight, preferably 2% to 20% by weight of emulsifiers,
   (D) 0% to 97% by weight of water, based in each case on the total weight of the defoamer formulation, wherein the polysiloxane copolymers (B) of claim 1 is present in an amount of 0.1% to 50% by weight of the defoamer formulation
   (E) preservatives, thickeners, and further additives.

15. The defoamer formulation of claim 1, which further comprises an emulsion of
   (A) 5% to 50% by weight of siloxane-based antifoams,
   (C) 2% to 20% by weight of an emulsifier,
   (D) 50% to 95% by weight of water, based in each case on the total weight of the defoamer formulation, wherein the polysiloxane copolymers (B) of claim 1 is present in an amount of 0.1% to 30% by weight of the defoamer formulation
   (E) preservatives, thickeners, and further additives.

16. The defoamer formulation of claim 1, wherein the siloxane-based antifoam (A) comprises a mixture of silica and polyorganosiloxane(s).

17. The defoamer formulation of claim 1, wherein the polysiloxane copolymers (B) are emulsified together with the antifoam (A), or the polysiloxane copolymers (B) are added after the preparation of an emulsion from the antifoam (A) in the form of an emulsion.

18. In a pulp production process wherein a defoamer composition is employed for defoaming an aqueous medium used in the process, the improvement comprising defoaming with a defoamer comprising at least one defoamer formulation of claim 1.

* * * * *